Nov. 20, 1962    M. I. FILLWEBER    3,064,951
ELECTRIC MIXER
Filed Nov. 3, 1960    2 Sheets-Sheet 1
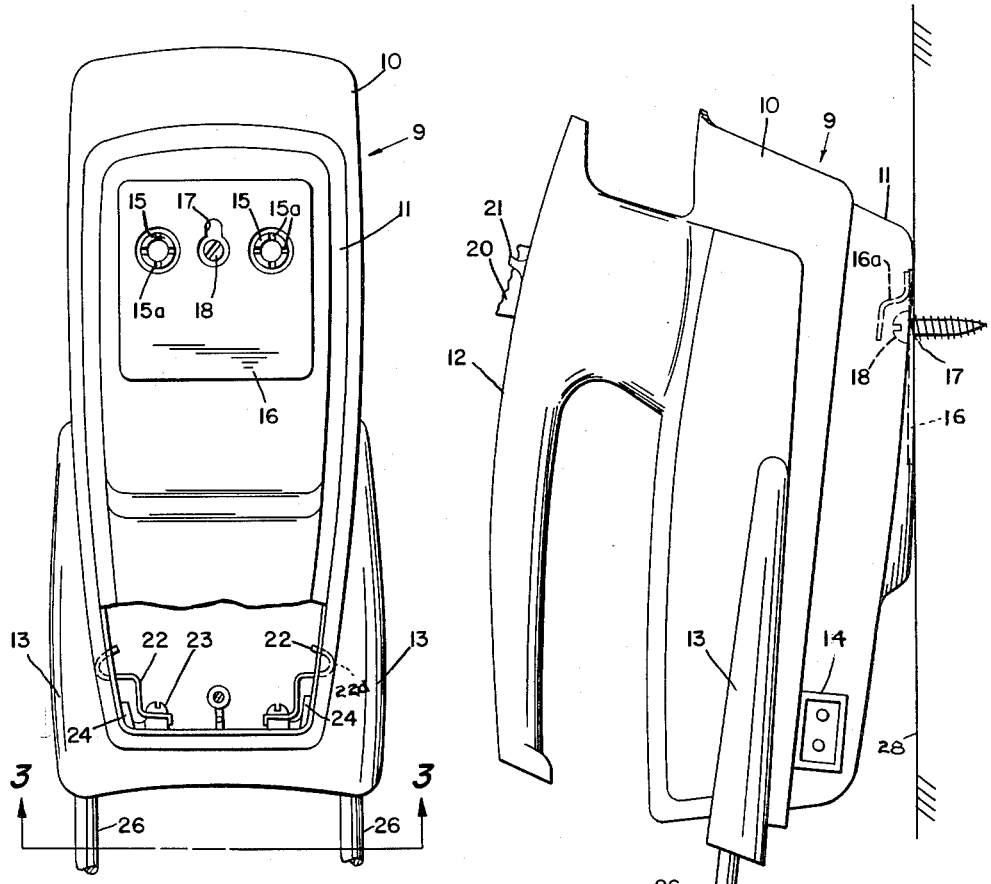
Fig. 1
Fig. 2
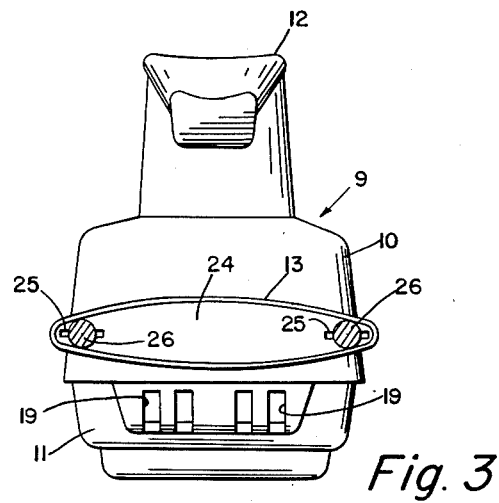
Fig. 3
INVENTOR.
MARCELLUS I. FILLWEBER
BY
Woodling, Krost, Granger and Rust
ATTORNEYS

United States Patent Office 3,064,951
Patented Nov. 20, 1962

3,064,951
ELECTRIC MIXER
Marcellus I. Fillweber, Mansfield, Ohio, assignor to Dominion Electric Corporation
Filed Nov. 3, 1960, Ser. No. 67,093
10 Claims. (Cl. 259—131)

My invention relates to electric mixers and particularly to portable mixers having removable mixing blades.

An object of my invention is to provide means for stowing the mixing members of an electric mixer when the mixer is suspended in a position out of use or operation.

Another object is the provision for retaining against the force of gravity mixing members removed from the driving spindles of an electric mixer and held by the casing or housing of the mixer.

Another object is the provision for retaining rotatable mixing members in a convenient location for storage when the mixer is out of use and readily accessible for mounting to the mixer when the mixer is to be used.

Another object is the provision of a unique means for retaining in a convenient location the rotatable mixing members of a portable electric mixer when the mixer is suspended adjacent an upright surface, such as a wall surface.

Other objects and a fuller understanding of the invention may be had by referring to the following description and claims, taken in conjunction with the accompanying drawings, in which:

FIGURE 1 is a bottom view of my improved mixer with a portion cut away;

FIGURE 2 is a side view of the mixer when suspended from a pin member on a wall and out of operation;

FIGURE 3 is an end view looking in the direction of the arrows 3—3 of FIGURE 1;

Figure 4:
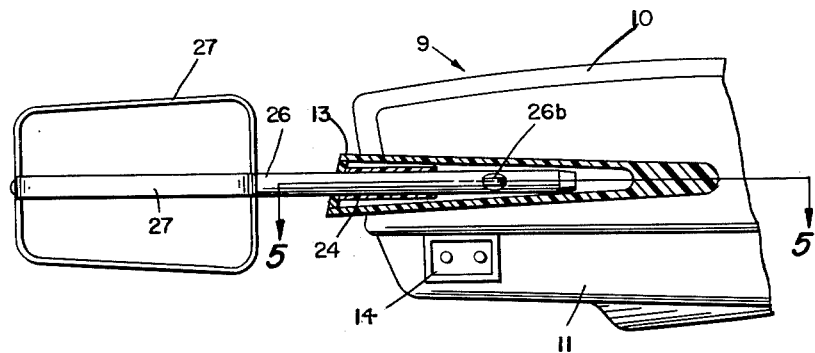
FIGURE 4 is a partial view in section of the rear end of my mixer illustrating the mounting of a mixing member in the housing.

My electric mixer has a housing 9 comprising an upper casing 10 and a lower casing 11, both preferably of molded plastic, and secured together to enclose an electric motor and a driving mechanism, not shown. The handle portion 12 extends longitudinally of the housing at a raised location from the top of the housing. The dimensions and weight of the mixer are such that it may be readily transported and used by hand in an operation wherein the user manually grasps the handle 12.

The electric motor through the driving mechanism within the housing 9 rotatably drives a pair of driving spindles 15. The axes of the driving spindles 15 are substantially parallel to each other and are coincidental with a plane transverse of the housing. Each spindle 15 has a splined socket with keyways 15a extending radially through the wall of the socketed spindle 15. The driving spindles are adapted to rotate the mixing members 26 upon insertion of the shafts of the mixing members in the respective sockets.

In the ordinary use of the portable mixer, the mixing members 26 having the looped blades 27 carried by the shaft of the mixing member extend outwardly from the housing in axial alignment of the spindles 15. The mixer is held by hand so as to place the blades 27 in a vessel containing ingredients or material to be mixed or agitated. The energy applied to the mixer rotates both of the mixing members 26 in the usual manner so as to obtain the desired mixing action.

Figure 7:
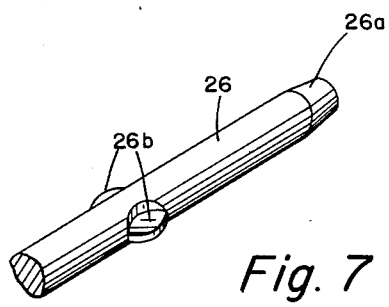
FIGURE 7 is a perspective view of the splined shaft portion of one of the mixing members of the portable mixer illustrated.

When the mixer is out of use and it is desired to store the mixer, then the two mixing members are withdrawn from the socketed spindles 15 by pulling outwardly therefrom so as to overcome the spring action. Each mixing member has bosses or keys 26b extending radially out from the shaft at a distance from but near the free end of the mixing member. The free end of the shaft is tapered, as shown at 26a in FIGURE 7. By reason of the tapered end 26a, the shaft is readily inserted into the socket of a spindle 15. The oppositely disposed keys or bosses 26b are disposed in oppositely disposed keyways 15a of each spindle so that there is a good driving engagement between the spindle and the mixing member. A suitable spring action provided in the socketed spindle provides a resiliently yieldable tension of the shaft of each mixing member in its respective socketed spindle. Upon manually pushing the mixing member axially in an outward direction from the socketed spindle 15, the mixing member is disengaged and removed from the mixer.

On the bottom of the housing 9 and surrounding the driving spindle 15, there is a cover plate 16 which encloses the interior of the housing. This cover plate 16, besides having openings for accommodating the spindles 15, also has a centrally located keyhole slot 17 formed therein, as illustrated in FIGURE 1. There is an offset strap portion 16a carried by the plate 16 and disposed inwardly of the main portion of the plate 16 opposite the keyhole slot 17.

When it is desired to hang or suspend the portable mixer from an upright surface, such as the wall 28 shown in FIGURE 2, the mixer is moved to the position shown in FIGURE 2. A pin member, such as a screw or other suitable member 18, is provided to protrude from the wall 28. The head of the pin or screw 18 goes into the larger part of the slotted opening 17 and upon moving the mixer downwardly, the head of the pin or screw 18 is interengaged with the narrow portion of the slotted opening 17 in such manner as to firmly secure the mixer in its suspended position adjacent the upright wall 28. To remove the mixer from the wall, the mixer is raised slightly to align the pin or screw 18 with the round and larger portion of the slotted keyhole 17 and then the mixer is moved away from the wall 28.

It is apparent that the mixing members 26 cannot be left in the socketed spindles 15 when the mixer is hung on a wall, such as in the position shown in FIGURE 2. It is also desirable to store the mixing members at a convenient location and preferably close by so as to be readily accessible for use. For this purpose, I provide means for retaining the mixing members to the housing. Extending rearwardly from the main body of the housing is a finned tail portion 13 which is integral with the upper portion 10 of the housing. This tail portion 13 in the position of the mixer shown in FIGURE 2 is at the lower part of the housing and extends along the side thereof. The tail portion 13 has two parallel openings 25 extending from the rearward end of the housing 9 and along axes substantially parallel to each other and substantially normal to a plane coincidental with the axes of the driving spindles 15. Each opening 25 has a round portion for accommodating the cylindrical part of the shaft of the respective mixing members and also has oppositely disposed slots or keyways for accommodating or permitting the bosses or keys 26b of each mixing member to be inserted into the opening 25 and within the housing. Unless the mixing member is rotated on its axis so that the cross-sectional shape of the shaft through the bosses 26b registers with the slotted opening 25, the keyed or splined shaft of the mixing member will not go into or enter the opening 25. Therefore, the complementary shape of each opening 25 assures that each mixing member is rotated the proper degree before the splined shaft end of the mixing member is inserted into a respective opening 25.

Aligned with one of the slots or keyways of each opening 25 is a detent member 22 which is carried by a leaf spring secured by screws 23 to an insert portion 24 extending inwardly of the tail portion 13. The bias of the leaf spring is such as to urge shaft-engaging portions 22a of the detent toward the axis of a respective opening 25 so that the detent member is resiliently urged against the axis of the shaft of a mixing member inserted into an opening 25. The end insert portion 24 is cemented or otherwise secured in place within the tail portion 13 so as to be part of the housing 9. The openings 25 are formed in the insert portion 24 and these openings 25 are part of and become merged with the interior cavity of the housing. The insert portion 24 provides a convenient way of closing the rear of the housing except for the openings 25 and also provides suitable anchors for the screws 23 holding the spring-biased detent members 22 in position.

Figure 5:
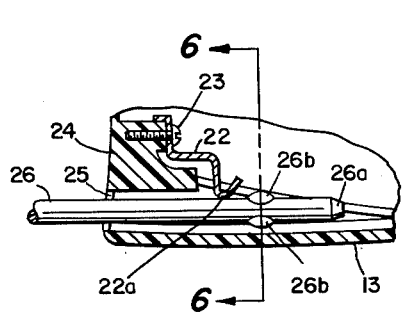
FIGURE 5 is a detailed sectional view taken through the line 5—5 of FIGURE 4.
Figure 6:
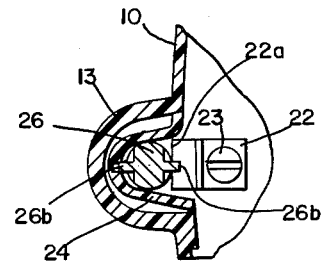
FIGURE 6 is a sectional view taken through the line 6—6 of FIGURE 5.

As seen in the drawings, the shaft-engaging portion 22a is so positioned that upon inserting the shaft of the mixing member inwardly of the housing 9, a boss 26b meets the portion 22a and resiliently pushes aside the detent which rides over the boss 26b. By reason of the complementary shape of the opening 25 relative to the cross-sectional shape of the splined shaft of the mixing member, it is always assured that one of the bosses or keys 26b is inserted in alignment with the portion 22a of the spring-biased detent member. Upon continued insertion of the shaft inwardly of the housing, the portion 22a rides over the boss or key 26b to the position shown in FIGURE 5. Here the mixing member is yieldably retained by the housing and the resilient urging of the detent member is sufficient to hold the respective mixing members to the housing in a suspended position, such as illustrated in FIGURE 2. However, by manually pulling the mixing member axially and outwardly of the respective opening 25, the boss or key 26b in alignment with the engaging portion 22a urges the flexing or yielding of the detent member so as to permit the boss or key 26b to slide out and beyond the engagement of the engaging portion 22a. The mixing member 26 may then be readily pulled outwardly from the opening 25 so as to be free of the housing. The action of inserting and removing each mixing member in its respective opening 25 is the same. After the mixing members are removed from the housing, then they may be inserted, when desired, in the socketed spindles 15 for the usual mixing operation of the device.

As seen in FIGURE 3, there are vents 19 in the lower portion 11 of the housing for providing ventilation to the interior of the housing. There is extending upwardly from the handle 12 a usual control switch button 21 for manually controlling the operation of the motor within the housing. There is also an ejector button 20 which extends upwardly from the handle adjacent the control button 21. This ejector button 20, upon being pressed downwardly acts to eject or press outwardly the mixing members from the socketed spindles 15 when it is desired to remove the mixing members from their driving engagement with the spindles. A plug receptacle 14 is adapted to provide an electric connection with an electric plug carrying electrical energy to the circuit of the electric motor in the mixer.

It is seen that by the unique structure and arrangement shown, the portable mixer is arranged for ready and convenient use and at the same time means is provided for stowing or retaining the pair of mixing members at a convenient location and suspended from the housing of the mixer, particularly when it is hung from a pin and adjacent an upright surface.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In an electric mixer having a housing, a pair of parallel driving spindles carried by the housing, the axes of said spindles being disposed in a first plane, said spindles having sockets, each of said sockets having oppositely disposed keyways formed in the walls thereof, a pair of mixing members each having a longitudinal shaft portion each of which is adapted to be rotated by one of said spindles, said shaft portions each having oppositely disposed key portions extending radially therefrom and keyable in the keyways of a said socket upon insertion of said shaft portions in each of said sockets, respectively, for rotation of said mixing members by said spindles, that improvement which comprises said housing having a pair of spaced openings formed therein, each said opening having a cylindrical bore portion angularly disposed to said first plane and in a second plane substantially normal to said first plane, each said opening being adapted to complementarily receive a said shaft portion of a said mixing member, each said cylindrical bore portion having oppositely disposed slots extending radially of said cylindrical bore portion and disposed to accommodate the key portions of a said shaft portion upon insertion of the said shaft portion into a said cylindrical bore portion, a pair of spring members carried by said housing each having a portion extending into a said opening in alignment with a said slot to engage and resiliently yield to a key portion of the shaft portion inserted into a respective cylindrical bore, said spring members each providing detent action to retain a shaft portion in a said recess, said mixing members being retainable by said detent action, to be selectively held in inoperative position by said housing and angularly disposed to said first plane, upon said shaft portions being removed from said sockets and inserted in said openings, respectively.

2. In a mixer having a pair of mixing members adapted to be rotatably driven by a pair of spindles, respectively, each spindle having a keyed socket and each mixing member having a shaft portion and key portions extending therefrom and adapted to complementarily fit in a said keyed socket for driving engagement with said spindles the improvement of, a pair of spaced retaining members carried by the mixer for holding said mixing members in inoperative positions along axes each at an acute angle to a plane coinciding with the axes of said spindles, each said retaining member having an axial bore to accommodate a said shaft portion and having keyways extending radially of the axial bore to accommodate said key portions, each said retaining member having spring-biased detent means aligned with a said keyway and adjacent a said bore to be resiliently displaced by a said key portion of a shaft portion inserted into a said axial bore and to yieldably bar axial withdrawal of said key portion from said bore, said retainer members being adapted to hold said mixing members in inoperative position at said acute angles to said plane.

3. In an electric mixer having a longitudinally extending housing, a pair of driving spindles each having a socket, each socket having keyways in the walls thereof, and a pair of mixing members each rotatable by a said driving spindle, each mixing member having a shaft portion insertable in a said socket and a pair of protuberances extending from opposite sides of the shaft portion at a distance from the end of the shaft portion and adapted to be accommodated in said keyways for providing a driving connection between the spindles and mixing members, said spindles having axes disposed in a plane transverse of said housing, said mixing members upon being mounted to said spindles extending from said housing in said plane, said housng having adjacent a first end thereof a mounting portion defining an aperture adapted to receive a supporting member for hanging the housing against an upright surface carrying the supporting member during non-use of the mixer, the improvement of means for holding said mixing members in inoperative position and supported by said housing upon said housing being hung against a said upright surface on a said supporting member, said means comprising a pair of spaced bores extending into a second end of said housing opposite said first end and having axes, respectively, disposed at substantially right angles to said transverse plane, said bores each having keyways extending therealong adjacent said first end to accommodate said protuberances to permit the same to enter said housing upon insertion of said shaft portions into said bores, and a pair of spring-biased detent members carried by and positioned within said housing each positioned adjacent a said bore and in alignment with a said keyway to be engaged by a said protuberance upon insertion of a said shaft portion in a said bore, said detent members being resiliently displaceable to permit the engaged protuberances to interlock with the respective detent members, said detent members being arranged to hold the mixing members to the housing the housing being hung with said second end directed downwardly on a said supporting member adjacent a said upright surface.

4. In an electric mixer having a housing, a pair of driving spindles carried by the housing, each spindle having a socket provided with keyways, and a pair of mixing members each having a shaft portion with keys protruding therefrom and adapted to fit in a said socket with the keys of the shaft portion disposed in said keyways, the improvement of a pair of spaced retainers carried by said housing for holding said mixing members to the housing in inoperative positions in a plane substantially normal to a plane coinciding with the axes of said spindles, each said retainer comprising a recessed portion of said housing defining an opening for receiving the said shaft portion of a mixing member, a wall portion adjacent the opening and carried by the housing, said wall portion having an open space aligned with said opening, said open space having keyways extending laterally therefrom to complement the cross-sectional shape of a said shaft portion and keys protruding therefrom to permit the shaft portion with keys protruding therefrom to pass through the said wall portion into said opening upon registration with said complementarily shaped open space, and a pair of spring-biased detent members carried by the housing, said detent members being positioned in said openings, respectively, in alignment with a keyway extending laterally of said open space to engage a key on the shaft portion inserted into said opening through said open space, said detent member resiliently yielding to said key upon engagement therewith to selectively retain and release the key upon axial manual movement of the shaft portion in said opening.

5. The improvement in an electric mixer having a housing, a pair of rotatable driving spindles having splined sockets, and a pair of mixing members each having keyed shaft portions adapted to be mounted in said sockets to be rotated by said spindles, comprising a pair of spaced recesses disposed in said housing along axes disposed normal to a plane coinciding with the axes of said spindles, said recesses each having a cross-sectional shape at the entry thereto corresponding to the cross-sectional shape of a keyed shaft portion to permit the same to enter the recess upon axial movement of the keyed shaft portion toward said housing in registration with said cross-sectional shape of the said entry of the opening, each said keyed shaft portion having a radially extending boss positioned at a distance from an end thereof, a pair of detent members each carried by said housing and extending inwardly of a said recess, and resilient means for resiliently urging each said detent member toward the axis of said opening to meet and yieldably engage the boss of a said keyed shaft portion as the keyed shaft portion is moved axially into a said recess, the detent members being yieldable upon being cammingly pressed by the respective bosses upon axial movement of the keyed shaft portions outwardly of the recesses.

6. In an electric mixer, means for suspending from the housing thereof the mixing members of the mixer upon the shaft end portions of the respective mixing members being withdrawn from the driving spindles and upon the mixer being suspended about a point of suspension adjacent a wall surface substantially normal to the axes of the said driving spindles, the shaft end portion of each mixing member having a radially extending boss protruding therefrom for splined interengagement with a driving spindle, the improvement of a pair of spaced openings provided in the end of the housing below the center of gravity of the mixer upon the mixer being suspended about said point of suspension, each of said openings being adapted to accommodate a shaft end portion of a mixing member, said housing at the entrance of each opening having a radially extending slot to accommodate said boss whereby the housing at said entrance to said opening complements the cross-sectional shape of the shaft end portion at said boss, and a pair of resiliently biased detent members carried by said housing each positioned in a said recess and resiliently urged inwardly thereof to engage a shaft end portion inserted in a said recess, each detent member being yieldably displaceable by a said boss aligned with a said slot upon the shaft end portion being moved axially of an opening, the detent members resiliently retaining the mixing members to said housing and permitting withdrawal of the mixing members therefrom by the interaction of said detent members and the respective bosses.

7. In a mixer having a housing and a splined mixing member, the mixing member having a shaft and a boss extending radially therefrom for driving engagement with a driving spindle, the improvement of a bore extending longitudinally of the housing from an end thereof and at an angle to the axis of the driving spindle, the bore having a keyway on a side thereof for accommodating the boss upon axial movement of the said shaft into said bore, a detent member disposed in alignment with said keyway athwart the path of said boss as said shaft is moved into said bore, and biasing means yieldably urging the detent member toward the axis of said bore, said detent member being radially displaced by the boss being moved inwardly of the housing upon insertion of the shaft in the bore to interlock with said boss and being radially displaced by the boss being moved outwardly of the housing upon withdrawal of the shaft from the bore to release said boss.

8. In an electric mixer having a pair of mixing members having splined shafts attachable to splined driving spindles of the mixer and detachable from said driving spindles, said mixer being adapted to be hung in an upright position on a supporting pin adjacent an upright surface when not in use with the axes of said spindles substantially normal to said upright surface and directed toward said upright surface and with a first end of the mixer directed downwardly upon the center of gravity of the mixer being located below said supporting pin, the improvement comprising a pair of retaining members carried by said mixer adjacent said first end, each said retaining member having an opening extending from said end longitudinally of the mixer, each said opening having a cross-sectional shape complementing the cross-sectional shape of the splined shaft at the maximum dimension thereof to permit insertion of the splined shaft into the opening from said one end upon registering the splined shaft with said opening, each said retaining member including a spring-biased detent member disposed to resiliently interengage with a splined shaft inserted in a said opening to yieldably retain the same upon hanging of the mixer on a said supporting pin with said first end directed downwardly.

9. The combination defined in claim 8 and in which each said opening has a slot extending longitudinally thereof along a side of the opening, the splined shaft of each mixing member having a key extending radially therefrom which complementarily fits in said slot upon insertion of the splined shaft in the respective opening, and the respective detent member is aligned with a said slot to engage the key of the splined shaft as it is inserted in the respective opening.

10. In an electric mixer having a pair of driving spindles and having a pair of mixing members each having a splined shaft removable from a driving spindle of the mixer and being adapted to be hung on a pin member adjacent an upright surface with an end of the mixer hanging downwardly therefrom, the combination of first means for receiving the splined shaft of the mixing members in spaced substantially parallel relationship and disposed along axes substantially normal to a plane coinciding with the axes of the driving spindles, second means for engaging the splined shaft received in said first means, and third means for resiliently urging the second means into position to yieldably engage the received splined shaft to retain the same against withdrawal by force of gravity upon hanging of the mixer on a said pin member with said one end hanging downwardly.

References Cited in the file of this patent

UNITED STATES PATENTS

| | | |
|---|---|---|
| 2,269,170 | Allenby | Jan. 6, 1942 |
| 2,483,727 | Frisbie | Oct. 4, 1949 |
| 2,578,901 | Schmidt | Dec. 18, 1951 |